United States Patent
Lee et al.

(10) Patent No.: US 11,928,850 B2
(45) Date of Patent: Mar. 12, 2024

(54) EVALUATION OF SIMILAR CONTENT-BASED IMAGES

(71) Applicant: Sony Group Corporation, Tokyo (JP)

(72) Inventors: Jong Hwa Lee, San Diego, CA (US); Praggya Garg, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 135 days.

(21) Appl. No.: 17/490,406

(22) Filed: Sep. 30, 2021

(65) Prior Publication Data

US 2022/0358327 A1 Nov. 10, 2022

Related U.S. Application Data

(60) Provisional application No. 63/184,274, filed on May 5, 2021.

(51) Int. Cl.
| | |
|---|---|
| *G06V 10/46* | (2022.01) |
| *G06F 18/22* | (2023.01) |
| *G06V 10/74* | (2022.01) |
| *G06V 10/75* | (2022.01) |

(52) U.S. Cl.
CPC ............ *G06V 10/462* (2022.01); *G06F 18/22* (2023.01); *G06V 10/74* (2022.01); *G06V 10/758* (2022.01)

(58) Field of Classification Search
CPC .... G06V 10/462; G06V 10/74; G06V 10/758; G06V 10/50; G06F 18/22
See application file for complete search history.

(56) References Cited

U.S. PATENT DOCUMENTS

| | | | |
|---|---|---|---|
| 8,090,222 B1* | 1/2012 | Baluja | G06F 16/955 707/723 |
| 9,727,586 B2* | 8/2017 | Li | G06V 10/462 |
| 10,691,743 B2 | 6/2020 | Sawhney | |
| 2015/0143236 A1* | 5/2015 | Tena Rodriguez | G06F 40/106 715/273 |
| 2016/0042251 A1* | 2/2016 | Cordova-Diba | G06F 16/583 382/199 |

(Continued)

OTHER PUBLICATIONS

Decombas et al. "A New Object Based Quality Metric Based on SIFT and SSIM", IEEE (Year: 2012).*

(Continued)

*Primary Examiner* — Aaron W Carter
(74) *Attorney, Agent, or Firm* — Trellis IP Law Group, PC

(57) ABSTRACT

Implementations generally relate to evaluation of similar content-based images. In some implementations, a method includes receiving a first image, where the first image includes at least one first object. The method further includes receiving a second image, where the second image includes at least one second object. The method further includes computing a structural similarity index measure (SSIM) value based on the at least one first object and the at least one second object. The method further includes computing a scale invariant feature transform (SIFT) value based on the at least one first object and the at least one second object. The method further includes computing a histogram value based on the at least one first object and the at least one second object. The method further includes computing a similarity score based on the SSIM value, the SIFT value, and the histogram value.

12 Claims, 8 Drawing Sheets

(56) References Cited

U.S. PATENT DOCUMENTS

| | | | | |
|---|---|---|---|---|
| 2016/0042252 | A1* | 2/2016 | Sawhney | G06F 16/5838 |
| | | | | 382/190 |
| 2016/0042253 | A1* | 2/2016 | Sawhney | G06F 18/2323 |
| | | | | 382/190 |
| 2016/0078507 | A1* | 3/2016 | Shivaswamy | G06Q 30/0629 |
| | | | | 705/26.2 |
| 2018/0131815 | A1* | 5/2018 | Spivakovsky | H04N 1/00015 |
| 2021/0097692 | A1 | 7/2021 | Roy Chowdhury | |
| 2021/0256289 | A1* | 8/2021 | Kumagai | G06V 10/751 |
| 2022/0358327 | A1* | 11/2022 | Lee | G06V 10/74 |
| 2022/0374647 | A1* | 11/2022 | Lee | G06F 18/2431 |
| 2023/0056672 | A1* | 2/2023 | Kim | G06F 18/2178 |
| 2023/0206441 | A1* | 6/2023 | Zhong | G06T 7/0012 |
| | | | | 382/128 |

OTHER PUBLICATIONS

Wang et al. "Image Quality Assessment: From Error Visibility to Structural Similarity", IEEE (Year: 2004).*

* cited by examiner

Red
Jalapeno Peppers
(Query Image)
300

Green
Jalapeno Peppers
400

Super Hero
(Query Image)
500

Super Hero

600

Super Hero

700

EVALUATION OF SIMILAR CONTENT-BASED IMAGES

CROSS REFERENCE TO RELATED APPLICATIONS

This application claims priority from U.S. Provisional Patent Application No. 63/184,274, entitled "OBJECTIVE METHOD TO EVALUATE SIMILARITY FOR CONTENTS-BASED IMAGES," filed May 5, 2021, which is hereby incorporated by reference as if set forth in full in this application for all purposes.

BACKGROUND

Image-search algorithms are used to find similar images across the Internet. Search techniques may involve the visual similarity of pixels of images (e.g., similar color). Searches may involve mean squared error (MSE) techniques, peak signal-to-noise ratio (PSNR) techniques, as well as other subjective assessment for measuring image similarity. Because MSE and PSNR techniques estimate absolute errors based on a pixel-by-pixel analysis, a search based on a query image of red jalapenos may produce search result images of red tomatoes due to the amount of similar red pixels. These techniques are commonly used for comparing the quality of an original image to restoration images, or may be used for matching an original image and a distorted image (e.g., due to blur, rotation, scale, illumination, etc.).

SUMMARY

Implementations generally relate to evaluation of similar content-based images. In some implementations, a system includes one or more processors, and includes logic encoded in one or more non-transitory computer-readable storage media for execution by the one or more processors. When executed, the logic is operable to cause the one or more processors to perform operations including: receiving a first image, where the first image includes at least one first object; receiving a second image, where the second image includes at least one second object; computing a structural similarity index measure (SSIM) value based on the at least one first object and the at least one second object; computing a scale invariant feature transform (SIFT) value based on the at least one first object and the at least one second object; computing a histogram value based on the at least one first object and the at least one second object; and computing a similarity score based on the SSIM value, the SIFT value, and the histogram value.

With further regard to the system, in some implementations, the SSIM value is based on one or more of luminance, contrast, and structure of the first image and the second image. In some implementations, the SIFT value is based on one or more predetermined features of the first image and the second image. In some implementations, the histogram value is based on frequencies of predetermined histogram values of the first image and the second image. In some implementations, the logic when executed is further operable to cause the one or more processors to perform operations including computing an adjusted SIFT value based on the SSIM value. In some implementations, the logic when executed is further operable to cause the one or more processors to perform operations including computing an adjusted histogram value based on the SSIM value and the SIFT value. In some implementations, the logic when executed is further operable to cause the one or more processors to perform operations including computing a sum of the SSIM value, an adjusted SIFT value, and an adjusted histogram value.

In some implementations, a non-transitory computer-readable storage medium with program instructions thereon is provided. When executed by one or more processors, the instructions are operable to cause the one or more processors to perform operations including: receiving a first image, where the first image includes at least one first object; receiving a second image, where the second image includes at least one second object; computing a structural similarity index measure (SSIM) value based on the at least one first object and the at least one second object; computing a scale invariant feature transform (SIFT) value based on the at least one first object and the at least one second object; computing a histogram value based on the at least one first object and the at least one second object; and computing a similarity score based on the SSIM value, the SIFT value, and the histogram value.

With further regard to the computer-readable storage medium, in some implementations, the SSIM value is based on one or more of luminance, contrast, and structure of the first image and the second image. In some implementations, the SIFT value is based on one or more predetermined features of the first image and the second image. In some implementations, the histogram value is based on frequencies of predetermined histogram values of the first image and the second image. In some implementations, the instructions when executed are further operable to cause the one or more processors to perform operations including computing an adjusted SIFT value based on the SSIM value. In some implementations, the instructions when executed are further operable to cause the one or more processors to perform operations including computing an adjusted histogram value based on the SSIM value and the SIFT value. In some implementations, the instructions when executed are further operable to cause the one or more processors to perform operations including computing a sum of the SSIM value, an adjusted SIFT value, and an adjusted histogram value.

In some implementations, a method includes: receiving a first image, where the first image includes at least one first object; receiving a second image, where the second image includes at least one second object; computing a structural similarity index measure (SSIM) value based on the at least one first object and the at least one second object; computing a scale invariant feature transform (SIFT) value based on the at least one first object and the at least one second object; computing a histogram value based on the at least one first object and the at least one second object; and computing a similarity score based on the SSIM value, the SIFT value, and the histogram value.

With further regard to the method, in some implementations, the SSIM value is based on one or more of luminance, contrast, and structure of the first image and the second image. In some implementations, the SIFT value is based on one or more predetermined features of the first image and the second image. In some implementations, the histogram value is based on frequencies of predetermined histogram values of the first image and the second image. In some implementations, the method further includes computing an adjusted SIFT value based on the SSIM value. In some implementations, the method further includes computing an adjusted histogram value based on the SSIM value and the SIFT value.

A further understanding of the nature and the advantages of particular implementations disclosed herein may be real-

DETAILED DESCRIPTION

Implementations described herein generally relate to the evaluation of similar content-based images. As described in more detail herein, a system searches for and ranks images that are similar to a query image. The system arranges search results in an order of similarity, where the results are determined subjectively (e.g., using a human visual system, etc.). Instead, the results are computed objectively based on the contents and/or objects when comparing found images to a query image. For example, the system analyzes features and structures in images in order to provide quantitative search results.

As described in more detail herein, in various implementations, a system receives a first image that includes at least one first object and receives a second image that includes at least one second object. The system then computes a structural similarity index measure (SSIM) value based on the at least one first object and the at least one second object. The system also computes a scale invariant feature transform (SIFT) value based on the at least one first object and the at least one second object. The system also computes a histogram value based on the at least one first object and the at least one second object. The system then computes a similarity score based on the SSIM value, the SIFT value, and the histogram value. As described in more detail herein the system adjusts the SIFT and histogram values in order to compute a more accurate similarity score. Although implementations disclosed herein are described in the context of still images, the implementations may also apply to image frames of videos.

Figure 1:
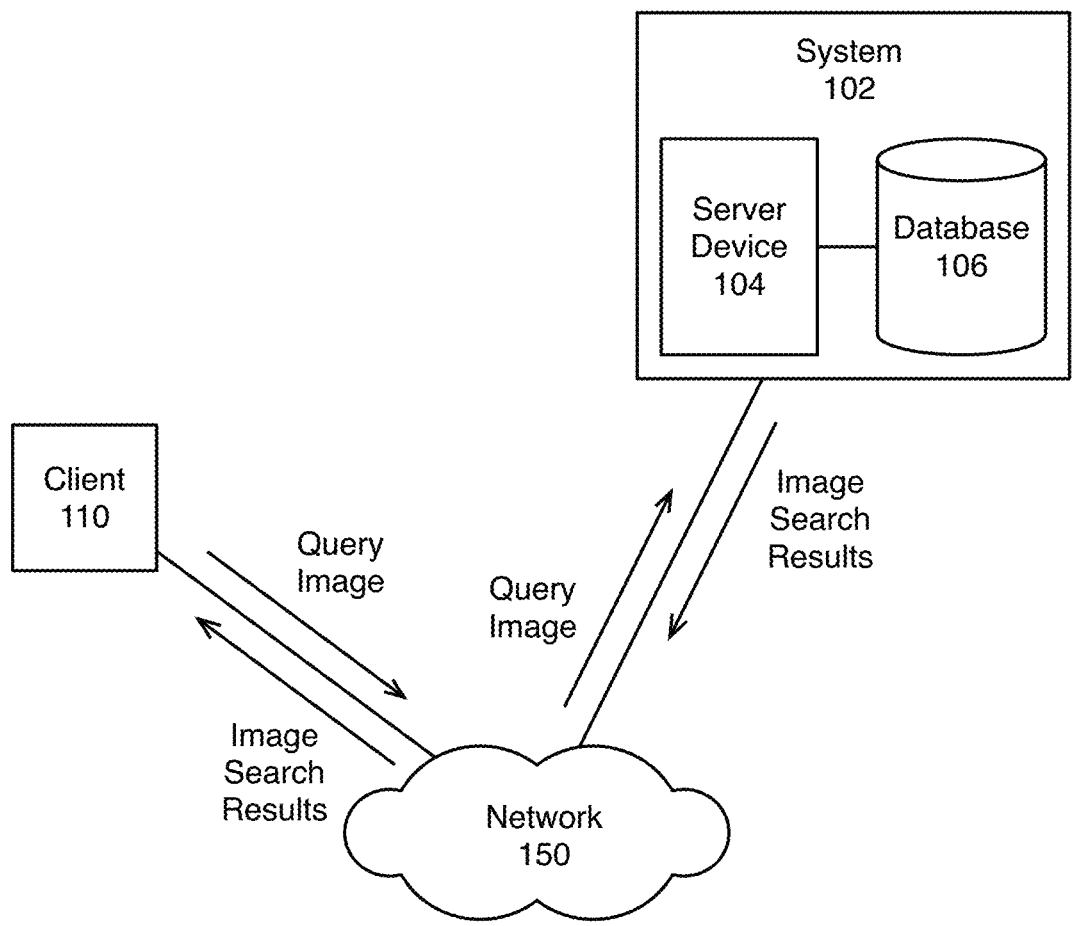
FIG. 1 is a block diagram of an example environment for evaluating similar content-based images, which may be used for implementations described herein.

FIG. 1 is a block diagram of an example network environment 100 for evaluating similar content-based images, which may be used for some implementations described herein. In some implementations, network environment 100 includes a system 102, which includes a server device 104 and a database 106. Network environment 100 also includes a client device 110, which communicates with system 102 via a network 150 of network environment 100. Network 150 may be any suitable communication network or combination of networks, which may include network types such as a Bluetooth network, a Wi-Fi network, the Internet, etc.

As described in more detail herein, system 102 receives a first image that includes at least one first object in the image. The first image is also referred to as a query image, which is to be used in an image search. System 102 performs a search to find other images with similar content. In various implementations, system 102 also ranks the images based on similarly. During the search, system 102 receives at least a second image that includes at least one second object. For ease of illustration, the second image is described. In various implementations, system 102 processes many other images (e.g., hundreds of images, thousands of images, etc.) in a similar manner to that of the second image.

As described in more detail herein, in various implementations, system 102 computes a structural similarity index measure (SSIM) value based on the first object in the first image and the second object in the second image. System 102 also computes a scale invariant feature transform (SIFT) value based on the first object and at least one second object. System 102 also computes a histogram value based on the first object and the second object. System 102 then computes a similarity score based on the SSIM value, the SIFT value, and the histogram value. System 102 performs these steps and others on multiple images that system 102 finds in the search. Further implementations directed to the generation and conducting of the surveys are described in more detail herein.

For ease of illustration, FIG. 1 shows one block for each of system 102, server device 104, database 106, and client device 110. Blocks 102, 104, 106, and 110 may represent multiple systems, server devices, databases, and clients. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

Figure 2:
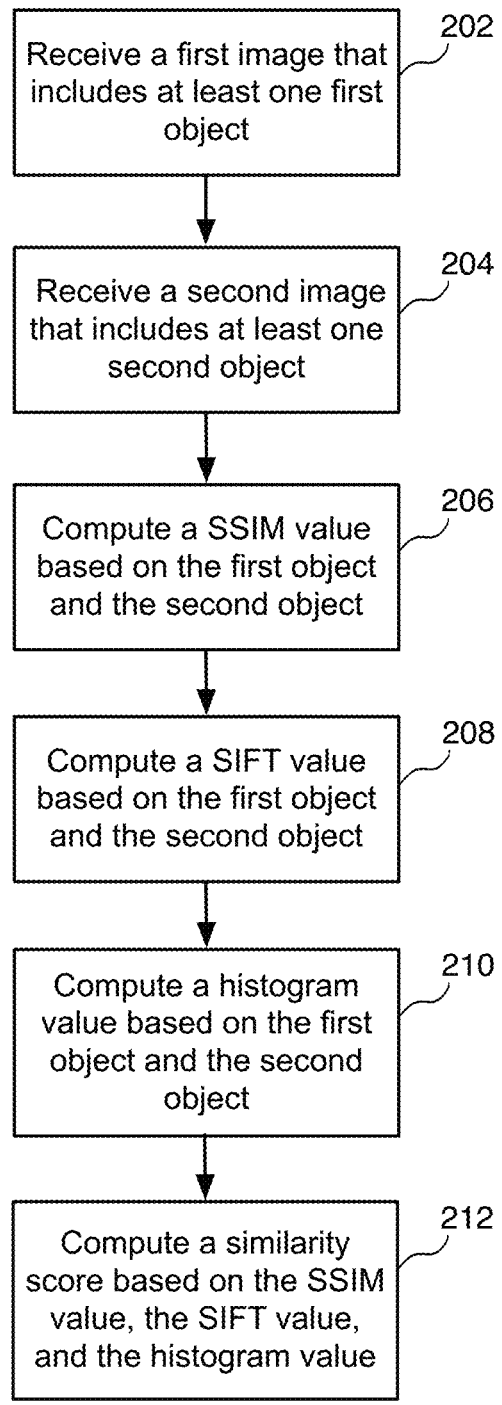
FIG. 2 is an example flow diagram for evaluating of similar content-based images, according to some implementations.

FIG. 2 is an example flow diagram for evaluating similar content-based images, according to some implementations. Referring to both FIGS. 1 and 2, a method is initiated at block 202, where a system such as system 102 receives a first image, where the first image includes a first object. The first image may be referred to as a query image, where system 102 performs a search for images that are similar to the query image. As described in more detail herein, system 102 also ranks the images found in the search based on their similarity to the query image.

Figure 3:
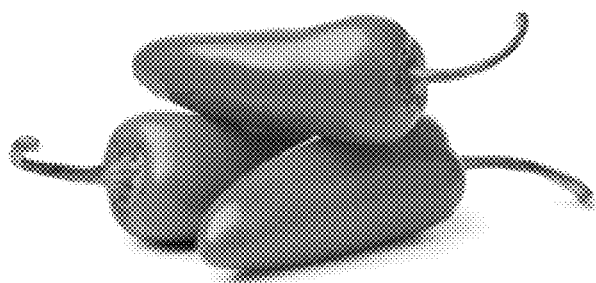
FIG. 3 is an example query image of red jalapeno peppers, according to some implementations.

FIG. 3 is an example query image 300 of red jalapeno peppers, according to some implementations. Shown are three jalapeno peppers, which are red in this example. For ease of illustration, the first image may be described herein in the context of one object. In various implementations, there may be one or more objects in the first image, as shown in query image 300. The number of objects in a given image may vary, depending on the particular implementation. For clarity, the terms first image and query image may be used interchangeably.

At block 204, system 102 receives a second image, where the second image includes a second object. The second image is one of many images that the system finds in an image search for images that are similar to the query image.

The system searches the Internet and/or other suitable database for search result images. The term second image and search result image may be used interchangeably. The system then performs other steps described herein to compare the second/search result image to the first/query image.

Figure 4:
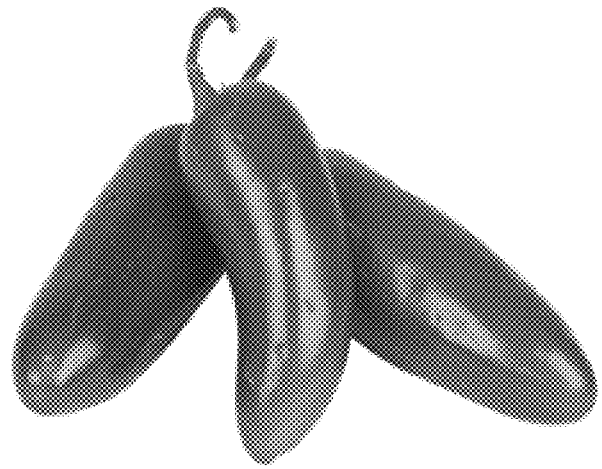
FIG. 4 is an example image of green jalapeno peppers found in image search results, according to some implementations.

FIG. 4 is an example image 400 of green jalapeno peppers found in image search results, according to some implementations. Shown are three jalapeno peppers, which are green in this example. For ease of illustration, the second image may be described herein in the context of one object. In various implementations, there may be one or more objects in the first image, as shown in image 400. The number of objects in a given image may vary, depending on the particular implementation. For clarity, the terms second image and search result image may be used interchangeably.

Implementations described herein produce search image results having objects of the same content as those objects in the query image even if the objects have different colors. This is because such searches are based on the content in the compared images, not mere pixels in the compared images. Aspects of such searches are described in more detail herein.

At block 206, system 102 computes a structural similarity index measure (SSIM) value based on the first object or objects in the query image and the second object or objects in the search result image. In various implementations, the system computes the SSIM value based on predetermined comparison measurements between two given samples such as the first and second images.

The predetermined comparison measurements for the SSIM value may include color, luminance, contrast, and structure. Structure may include shape. As such, in various implementations, the SSIM value is based on one or more of color, luminance, contrast, and structure of the first image and the second image. In various implementations, the system analyzes objects in the images for these measurements. The predetermined comparison measurements may vary, depending on the particular implementation.

The system calculates the SSIM value based on the first and second images. In some implementations, the SSIM value is a value between 0 and 1. A value of +1 indicates that the first and second images are very similar or the same. A value of 0 indicates that the first and second images are very different.

Images such image 300 of FIG. 3 (red jalapeno peppers) and image 400 of FIG. 4 (green jalapeno peppers) are visually similar because they are structurally similar. They have similar shapes (e.g., jalapeno pepper shaped, etc.) and similar features (e.g., jalapeno stems, etc.). In this example, the system computes an SSIM value closer to 1. As such, the system still includes image 400 in a set of similar images to image 300 even if image 400 has objects that have a different color from those of image 300. This is because the system analyzes the content of the images (not merely the colors). The search result image 400 is similar to query image 300 based at least on similarity in structure. In other words, images 300 and 400 are content-based similar. As such, implementations described herein provide a blind evaluation of not only visually similar images but also content-based or feature-based similar images.

At block 208, system 102 computes a scale invariant feature transform (SIFT) value based on the first object and the second object. In various implementations, the SIFT value is based on one or more predetermined features of the first image and the second image. In various implementations, the SIFT is a feature detection algorithm in computer vision. The SIFT algorithm finds correspondences in the first and second images. These correspondences of local features in each image may be referred to as keypoints of an image. These keypoints are scale and rotation invariants that can be used to evaluate the degree of similarity between the first and second images. In addition to being based on the keypoints, the SIFT value is also based on the background of the search result image compared with the background of the query image. In various implementations, the system analyzes keypoints of objects as well as the background in images for these measurements.

The example described above involves green jalapeno peppers found in a search result image that are similar to the red jalapeno peppers in the query image. In this example, there is no background in the images to consider. In various implementations, the system includes the additional SIFT value in order to provide more accuracy in determining similarity between a given search result image and the query image, especially if the content of the images are more complex with backgrounds, etc.

Figure 5:
FIG. 5 is an example query image of a super hero, according to some implementations.
Figure 6:
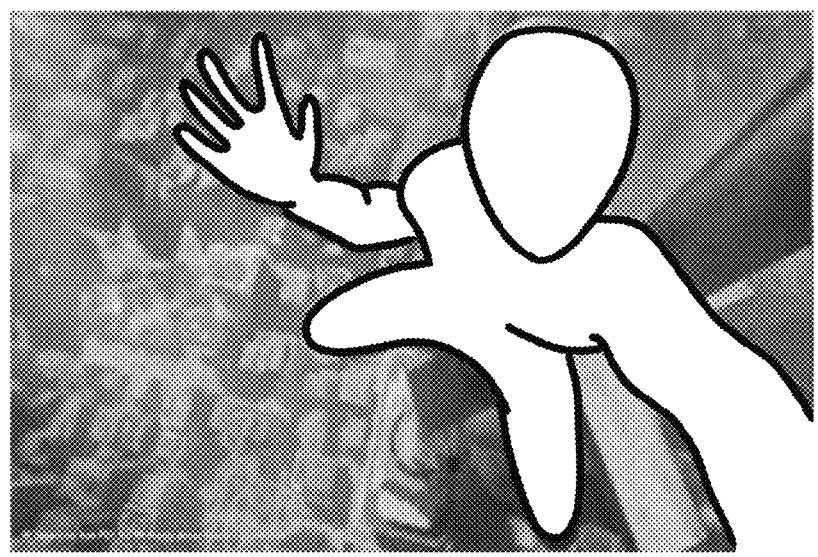
FIG. 6 is an example image of a super hero found in image search results, according to some implementations.
Figure 7:
FIG. 7 is an example image of a person found in image search results, according to some implementations.

The follow example query image of FIG. 5 and associated search result images of FIGS. 6 and 7 are more complex in their context. As described in more detail herein in connection with the remaining steps of the process of FIG. 2 and the images of FIGS. 5, 6, and 7, the system employs additional analyses and computes additional values. These additional analyses and values facilitate the system in more accurately finding similar search result images and in more accurately ranking the search result images based on similarity. The images of FIGS. 5, 6, and 7 are described below, followed by descriptions of the additional analyses and computations that the system performs when finding search result images and ranking such images.

FIG. 5 is an example query image 500 of a super hero, according to some implementations. The content of a given query image may vary, depending on the particular implementation. For example, in various implementations, the super hero of image 500 may wear a suit having a particular color combination (e.g., black and yellow, black and red, etc.) with any number of colors in the combination. The suit may include a face mask also having a particular color combination. Both the suit and associated face mask may have other distinguishing marks or patterns. As shown, the super hero covers most of the image area. Also, the background in the image is mostly a darker color with nondescript lighter colored portions.

FIG. 6 is an example image 600 of a super hero found in image search results, according to some implementations. In this example image, the content of the image includes the same super hero as shown in query image 500. In this example implementation, the super hero of image 600 is wearing the same suit including the same face mask as the super hero of image 500 of FIG. 5. Also, the super hero covers less than half of the image area, and the background in the image is mostly a lighter color with what appears to be an aerial perspective of city buildings.

FIG. 7 is an example image 700 of a person found in image search results, according to some implementations. In this example image, the content of the image includes a person. The person is wearing clothing that is different from the suit of the super hero of images 500 and 600 of respective FIGS. 5 and 6, but with some similar colors. The person is also wearing a face mask that is different from the mask of the super hero of images 500 and 600 of respective FIGS. 5 and 6.

In various implementations, the system computes an adjusted SIFT value based on the SSIM value. For example, the system may compute the adjusted SIFT value by multiplying the SIFT value (associated with a given search result image and the query image) with an SSIM factor (associated with the given search result image and the query image). With regard to images 500, 600, and 700, the system may include images 600 and 700 in the set of search result images that are similar to query image 500.

At block 210 of FIG. 2, system 102 computes a histogram value based on the first object and the second object. The histogram shows how frequently or infrequently certain values occur in the first and second images. In various implementations, the histogram is a distribution of its discrete intensity levels, where the range may range between 0 and L−1. In various implementations, the histogram value is also based on various factors such as mood and brightness. For example, a given image may have certain levels brightness at particular regions of the image. Such brightness levels may indicate a time of day (e.g., morning, afternoon, evening, etc.). Such brightness levels may also indicate whether objects in a given image are indoors, outdoors, etc.

In various implementations, the histogram value is based on frequencies of predetermined histogram values of the first image and the second image. In various implementations, the histogram is a normalized histogram. Also, the normalization of the histogram is a technique that involves transforming the discrete distribution of intensities into a discrete distribution of probabilities. To perform this transformation, the system divides each value of the histogram by the number of pixels.

In various implementations, the system computes an adjusted histogram value based on the SSIM value and the SIFT value. For example, the system may compute the adjusted histogram value by multiplying the histogram value by an SSIM factor and by a SIFT factor.

At block 212, system 102 computes a similarity score based on the SSIM value, the SIFT value, and the histogram value. In various implementations, the system applies the following expression to the first and second image:

$$SSIM+(1-SSIM)*SIFT+(1-SSIM)*(1-SIFT)*Histogram.$$

The system computes a similarity score that ranges from 0 to 1. Also, as indicated herein, the system computes the similarity score for each search result image that the system finds during the search.

In various implementations, to compute a similarity score, the system computes a sum of the SSIM value, an adjusted SIFT value, and an adjusted histogram value. The similarity score approaches 0 as the at least one first object and the at least one second object become less similar, and where the similarity score approaches 1 as the at least one first object and the at least one second object become more similar.

In an example computation of SSIM+(1−SSIM)*SIFT+(1−SSIM)*(1−SIFT)*Histogram, the system may compute the SSIM value to be 0.8, which indicates relatively high similarity (e.g., similar objects). The system may compute the SIFT value to be 0.1, which indicates relatively low similarity (e.g., dissimilar background). The system may compute the adjusted SIFT value to be (1−0.8)*0.1 or (0.2)*0.1 or 0.02. The system may compute the histogram be 0.1, which indicates relatively low similarity (e.g., dissimilar mood, lighting, etc.). The system may compute the adjusted histogram value to be (1−0.8)*(1−0.1)*0.1 or (0.2)*(0.9)*(0.1) or 0.018. The resulting similarity score would be 0.8218.

In various implementations, the system ranks the search result images 600 and 700 (among other search result images) based on their similarities to the query image. Referring to the example of query image 500 of FIG. 5 and search result images 600 and 700 of respective FIGS. 6 and 7, the system would rank image 600 higher than image 700 in terms of similarity, and resulting similarity score. For example, image 600 includes an object that based on the SSIM value resembles the same super hero as that in query image 500. While image 600 includes a background that based on the SIFT value is different from that of query image 500, the SSIM value carries more weight than the SIFT value. As such, the system will rank image 600 higher than image 700 based on the SSIM and SIFT values alone.

Also, while image 600 includes a mood that based on the histogram value is different from that of query image 500, the SSIM value carries more weight than the histogram value. As such, the system will rank image 600 higher than image 700 based on the SSIM and histogram values alone.

A conventional sorting technique may rank image 700 higher than image 600 from looking at pixels alone. Because the system 102 analyzes and compares the images based on SSIM values, SIFT values, and histogram values, the system more accurately ranks search result images.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations described herein may also be applied to reverse image searches, label matching, image tracking, and image recognition. Implementations may also be used for key frame searches, similar image searches, and reverse searches for image and/or video.

Figure 8:
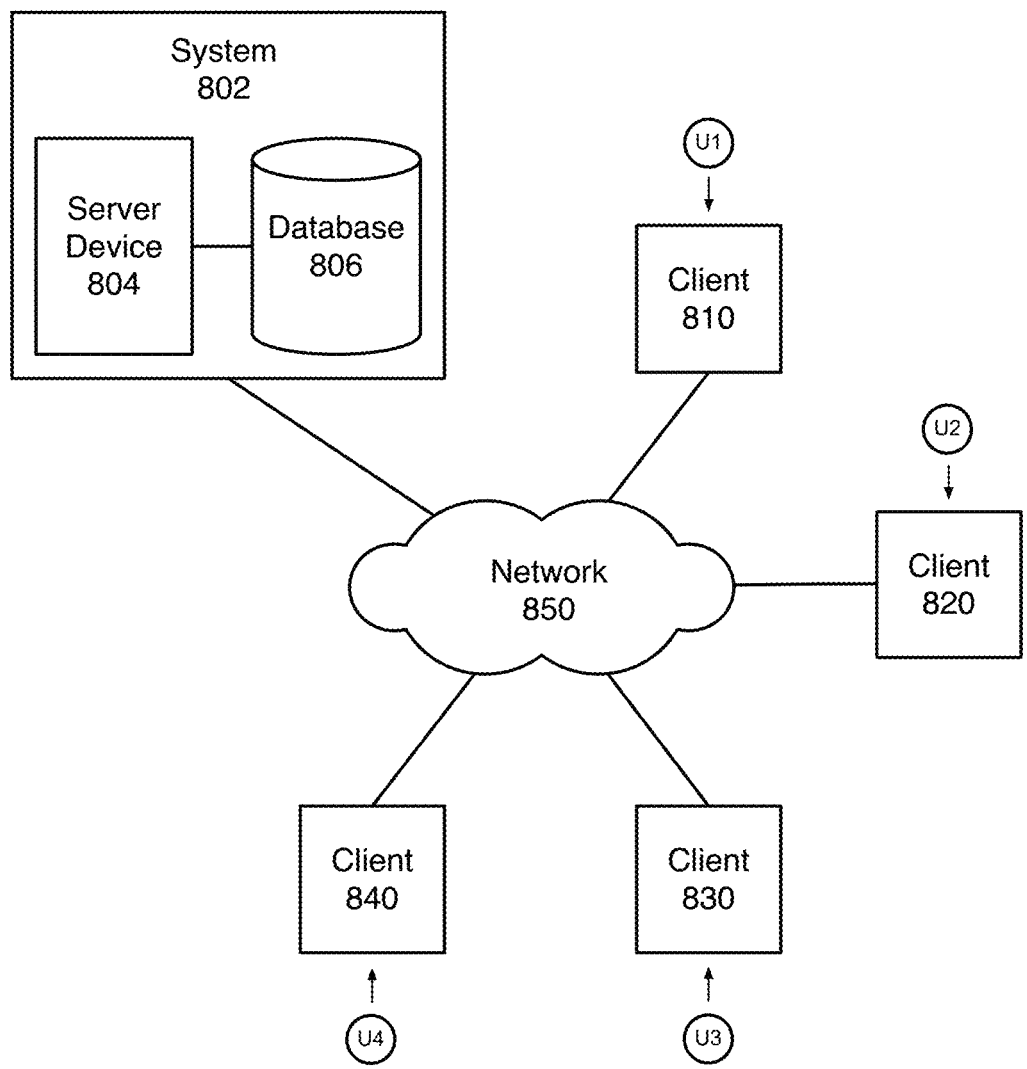
FIG. 8 is a block diagram of an example network environment, which may be used for some implementations described herein.

FIG. 8 is a block diagram of an example network environment 800, which may be used for some implementations described herein. In some implementations, network environment 800 includes a system 802, which includes a server device 804 and a database 806. For example, system 802 may be used to implement system 102 of FIG. 1, as well as to perform implementations described herein. Network environment 800 also includes client devices 810, 820, 830, and 480, which may communicate with system 802 and/or may communicate with each other directly or via system 802. Network environment 800 also includes a network 850 through which system 802 and client devices 810, 820, 830, and 840 communicate. Network 850 may be any suitable communication network such as a Wi-Fi network, Bluetooth network, the Internet, etc.

For ease of illustration, FIG. 8 shows one block for each of system 802, server device 804, and network database 806, and shows four blocks for client devices 810, 820, 830, and 840. Blocks 802, 804, and 806 may represent multiple systems, server devices, and network databases. Also, there may be any number of client devices. In other implementations, environment 800 may not have all of the components shown and/or may have other elements including other types of elements instead of, or in addition to, those shown herein.

While server device 804 of system 802 performs implementations described herein, in other implementations, any suitable component or combination of components associated with system 802 or any suitable processor or processors associated with system 802 may facilitate performing the implementations described herein.

In the various implementations described herein, a processor of system 802 and/or a processor of any client device 810, 820, 830, and 840 cause the elements described herein (e.g., information, etc.) to be displayed in a user interface on one or more display screens.

Figure 9:
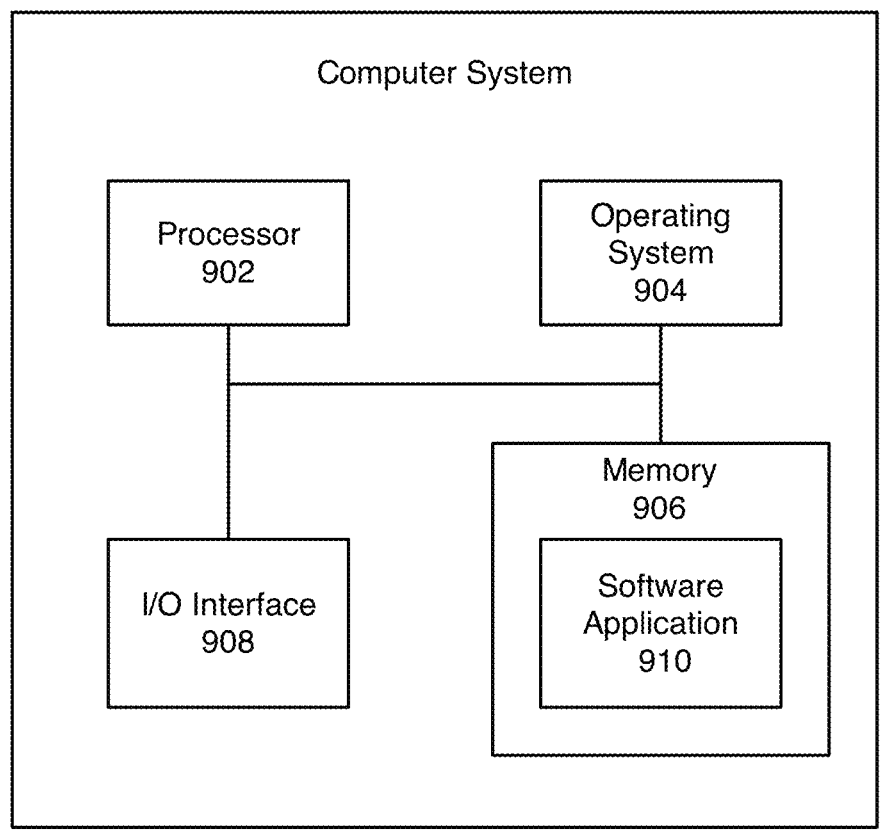
FIG. 9 is a block diagram of an example computer system, which may be used for some implementations described herein.

FIG. 9 is a block diagram of an example computer system 900, which may be used for some implementations described herein. For example, computer system 900 may be used to implement server device 804 of FIG. 8 and/or system 102 of FIG. 1, as well as to perform implementations described herein. In some implementations, computer system 900 may include a processor 902, an operating system 904, a memory 906, and an input/output (I/O) interface 908. In various implementations, processor 902 may be used to implement various functions and features described herein, as well as to perform the method implementations described herein. While processor 902 is described as performing implementations described herein, any suitable component or combination of components of computer system 900 or any suitable processor or processors associated with computer system 900 or any suitable system may perform the steps described. Implementations described herein may be carried out on a user device, on a server, or a combination of both.

Computer system 900 also includes a software application 910, which may be stored on memory 906 or on any other suitable storage location or computer-readable medium. Software application 910 provides instructions that enable processor 902 to perform the implementations described herein and other functions. Software application may also include an engine such as a network engine for performing various functions associated with one or more networks and network communications. The components of computer system 900 may be implemented by one or more processors or any combination of hardware devices, as well as any combination of hardware, software, firmware, etc.

For ease of illustration, FIG. 9 shows one block for each of processor 902, operating system 904, memory 906, I/O interface 908, and software application 910. These blocks 902, 904, 906, 908, and 910 may represent multiple processors, operating systems, memories, I/O interfaces, and software applications. In various implementations, computer system 900 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
receiving a first image, wherein the first image includes at least one first object;
receiving a second image, wherein the second image includes at least one second object;
computing a structural similarity index measure (SSIM) value based on the at least one first object and the at least one second object;
computing a scale invariant feature transform (SIFT) value based on the at least one first object and the at least one second object;
computing an adjusted SIFT value by multiplying the SIFT value by an SSIM factor;
computing a histogram value based on the at least one first object and the at least one second object;
computing an adjusted histogram value by multiplying the histogram value by an SSIM factor and by a SIFT factor;
computing a sum of the SSIM value, the adjusted SIFT value, and the adjusted histogram value; and
computing a similarity score based on the sum of the SSIM value, the adjusted SIFT value, and the adjusted histogram value.

2. The system of claim 1, wherein the SSIM value is based on one or more of luminance, contrast, and structure of the first image and the second image.

3. The system of claim 1, wherein the SIFT value is based on one or more predetermined features of the first image and the second image.

4. The system of claim 1, wherein the histogram value is based on frequencies of predetermined histogram values of the first image and the second image.

5. A non-transitory computer-readable storage medium with program instructions stored thereon, the program instructions when executed by one or more processors are operable to cause the one or more processors to perform operations comprising:
receiving a first image, wherein the first image includes at least one first object;
receiving a second image, wherein the second image includes at least one second object;
computing a structural similarity index measure (SSIM) value based on the at least one first object and the at least one second object;
computing a scale invariant feature transform (SIFT) value based on the at least one first object and the at least one second object;
computing an adjusted SIFT value by multiplying the SIFT value by an SSIM factor;
computing a histogram value based on the at least one first object and the at least one second object;
computing an adjusted histogram value by multiplying the histogram value by an SSIM factor and by a SIFT factor;
computing a sum of the SSIM value, the adjusted SIFT value, and the adjusted histogram value; and
computing a similarity score based on the sum of the SSIM value, the adjusted SIFT value, and the adjusted histogram value.

6. The computer-readable storage medium of claim 5, wherein the SSIM value is based on one or more of luminance, contrast, and structure of the first image and the second image.

7. The computer-readable storage medium of claim 5, wherein the SIFT value is based on one or more predetermined features of the first image and the second image.

8. The computer-readable storage medium of claim 5, wherein the histogram value is based on frequencies of predetermined histogram values of the first image and the second image.

9. A computer-implemented method for evaluating similar content-based images, the method comprising:
receiving a first image, wherein the first image includes at least one first object;
receiving a second image, wherein the second image includes at least one second object;
computing a structural similarity index measure (SSIM) value based on the at least one first object and the at least one second object;
computing a scale invariant feature transform (SIFT) value based on the at least one first object and the at least one second object;
computing an adjusted SIFT value by multiplying the SIFT value by an SSIM factor;
computing a histogram value based on the at least one first object and the at least one second object;
computing an adjusted histogram value by multiplying the histogram value by an SSIM factor and by a SIFT factor;
computing a sum of the SSIM value, the adjusted SIFT value, and the adjusted histogram value; and
computing a similarity score based on the sum of the SSIM value, the adjusted SIFT value, and the adjusted histogram value.

10. The method of claim 9, wherein the SSIM value is based on one or more of luminance, contrast, and structure of the first image and the second image.

11. The method of claim 9, wherein the SIFT value is based on one or more predetermined features of the first image and the second image.

12. The method of claim 9, wherein the histogram value is based on frequencies of predetermined histogram values of the first image and the second image.

* * * * *